United States Patent [19]

Kneer

[11] Patent Number: 4,595,506
[45] Date of Patent: Jun. 17, 1986

[54] FILTERING AID FOR THE TREATMENT OF SUSPENSIONS, PARTICULARLY OF DOMESTIC, INDUSTRIAL, AND OTHER SLUDGES FOR SUBSEQUENT DRAINING

[75] Inventor: Franz X. Kneer, Eschenburg-Eibelshausen, Fed. Rep. of Germany

[73] Assignee: Gebrüder Weiss K.G., Dillenburg, Fed. Rep. of Germany

[21] Appl. No.: 550,484

[22] Filed: Dec. 21, 1983

Related U.S. Application Data

[60] Division of Ser. No. 255,814, Apr. 20, 1981, abandoned, which is a continuation-in-part of Ser. No. 56,196, Jul. 19, 1979, abandoned.

[30] Foreign Application Priority Data

Jul. 17, 1978 [DE] Fed. Rep. of Germany ....... 2831384

[51] Int. Cl.⁴ ............................................. C02F 11/12
[52] U.S. Cl. ..................................... 210/609; 210/777; 210/783
[58] Field of Search ........................... 71/9, 11, 12, 24; 210/609, 691, 710, 777, 778, 783, 400, 401, 502; 252/427

[56] References Cited

U.S. PATENT DOCUMENTS

| | | | |
|---|---|---|---|
| 3,200,949 | 8/1965 | Aulich et al. | 210/205 |
| 3,325,016 | 6/1967 | Zurich | 210/502 |
| 3,428,551 | 2/1969 | Dawe | 210/502 |
| 3,771,653 | 11/1973 | Harnett | 210/691 |
| 3,791,990 | 2/1974 | Fischer | 252/427 |
| 4,062,770 | 12/1977 | Kneer | 71/9 |
| 4,161,426 | 7/1979 | Kneer | 55/74 |
| 4,249,929 | 2/1981 | Kneer | 71/9 |

FOREIGN PATENT DOCUMENTS 1960365 6/1971 Fed. Rep. of Germany.
1965734 7/1971 Fed. Rep. of Germany.

Primary Examiner—Peter Hruskoci
Attorney, Agent, or Firm—Toren, McGeady, Stanger, Goldberg & Kiel

[57] ABSTRACT

A method for the draining of sludges utilizing a filter aid composed of a mixture of porous organic materials capable of absorbing large amounts of liquid to absorb the sludge particles and a ballast liquid containing particles larger than the sludge particles is disclosed. The filtering aid prevents the redissolving of the sludge particles normally observed in chemical flocculation and chemical contamination of the agent.

7 Claims, 1 Drawing Figure

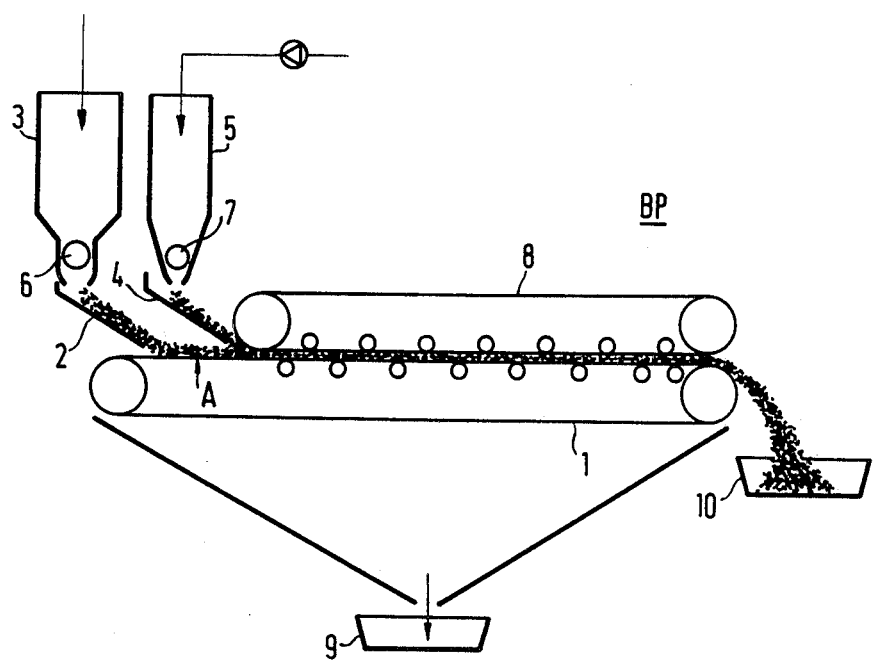

FILTERING AID FOR THE TREATMENT OF SUSPENSIONS, PARTICULARLY OF DOMESTIC, INDUSTRIAL, AND OTHER SLUDGES FOR SUBSEQUENT DRAINING

CROSS-REFERENCE TO RELATED APPLICATIONS

This is a divisional application of application Ser. No. 255,814, filed Apr. 20, 1981 now abandoned, which, in turn, is a continuation-in-part of application Ser. No. 056,196, filed July 19, 1979 now abandoned.

BACKGROUND OF THE INVENTION

1. Field of the Invention

The invention relates to a filtering aid for the treatment of suspensions and particularly of domestic, industrial, and other sludges, for subsequent draining.

2. Description of the Prior Art

The draining of sludges, particularly of sewage sludges, is only possible with so-called filtering aids because of the small particle size of the sludge particles, the surface tension of the sludge liquor, the viscosity, the high compressibility, and other properties which lead to a high specific filter resistance of the sludges. Known filtering aids are iron salts and aluminum salts in connection with calcium hydroxides and, more recently, high molecular weight, water-soluble polymers with cationic character. By adding such filtering aids in a dosed manner and mixing them with the sludge before it is drained, due to the exchange of electric charges to the suspended sludge particles, the surfaces of the particles are destabilized and rendered capable of coagulation and flocculation. See U. Möller "Zur Technologie der Schlammentwässerung" (Concerning the Technology of Sludge Draining) Städtehygiene 3/1967, pages 54 to 59.

The flakes or flocks formed by the use of polymers are, due to their structure, much looser than those obtained from a conventional coagulation so that the final water content of the mechanically drained sludge is smaller. However, they are very sensitive to mechanical stress, so that not all known draining methods can be readily used. Also, aeration of the sludge over a longer period also has a negative effect on the flakes and leads to their destruction. Since domestic sludges accumulate daily in large amounts, such filtering aids significantly increase the operating cost of sewage treatment plants. Finally, such chemical additives are a burden on the biological system, particularly when the accumulated sewage sludge is to be returned into the biological cycle in the form of compost.

SUMMARY OF THE INVENTION

I have discovered an inexpensive filtering aid for the draining of suspensions, particularly of sludges, which consist essentially of biologically-physically acting materials, by means of which at least the particle size and particle density of the particles dissolved in the suspension are permanently increased for the subsequent filtration but which also produces a decrease in the viscosity of the suspension. I have also discovered a new method for the draining of suspensions, particularly of sludges, with the use of such filtering aids.

More specifically, the filtering aid of the present invention is a mixture of porous organic materials of high liquid absorbing power which absorb the sludge particles and a ballast liquid having particles significantly larger than the sludge particles.

BRIEF DESCRIPTION OF THE DRAWING

The drawing is a schematic diagram of the process according to the present invention.

DESCRIPTION OF THE PREFERRED EMBODIMENT

In accordance with a preferred embodiment of the invention, the filtering aid may be a largely decomposed but biologically active compost having been comminuted into a uniform structure with an average particle size of no more than about 10 cm, and having high water absorption capability and a water content of about 30 to 50 percent by weight.

In particular, the biologically active compost used in the filtering aid of the present invention has the following characteristics:
water content: 37.4%
organic substance: 55.3%
pH value: 7.0
strong fungoid-smells like compost color: dark brown
little fluorescence
bacteria:
    actinomyces (grey)
    actinomyces (white)
fungi: micromonospora species.

Such a compost may be prepared utilizing a process as described in U.S. patent application Ser. No. 956,784, the contents of which are incorporated herein by reference.

In the method of the present invention for draining suspensions, and particularly sludges, using the above-mentioned filtering aids, a layer of filtering aids with a thickness of about 2 to 10 cm is uniformly and loosely placed on the screen belt of a traveling screen press. This layer is then impregnated by spraying with the suspension to be drained in an amount which is 5 to 10 times that of the applied layer and the layer is subsequently drained by pressure.

Compost is advantageous when used as the biologically and/or physically acting filtering aid. The compost which is placed on the screen belt results in significantly increased particle size of the sludge particles by the dosed addition of sludge.

This is because these particles are transported into the capillaries of the compost when the compost absorbs the liquid. Accordingly, as in a deep-bed filtration, the particles which are smaller than the pore size of the compost particles enter the capillaries of the latter and are deposited therein. The viscosity of the sludge is significantly reduced by the fibrous structure of the compost.

Since further biological, exothermal reaction processes start immediately when the sewage sludge is introduced into a compost layer, the temperature of the sludge is increased which results in a reduction of the surface tension of the sludge water. The compost remains stable during the mechanical draining procedure. Accordingly, the redissolving of the sludge particles observed in chemical flocculating agents no longer occurs in the subsequent mechanical draining or aerating. Even industrial sludges whose flocculation is difficult or impossible can be drained in using the present process.

The addition of compost is neither a chemical burden on the decay process for transforming, for example, sewage sludge into compost, nor on the ballast water which has been separated from the sludge. Moreover, the portion of carbon in the filter cake is increased which has a positive effect on the carbon-nitrogen ratio in a subsequent biological utilization, for example, in a decaying procedure. When compost is used as a filtering aid, it is not necessary to add returned material to the decaying process for the purpose of inoculation and improvement of the structure of the drained sludge. The addition of such materials, which facilitate the decaying process, has already taken place in the draining. Accordingly, for the subsequent method step of the sludge removal, it is merely necessary to add filter cake and carbon carrier to the decay process. This also has a favorable effect on the mixing procedure which always precedes a decay process.

The filter cake as well as the filtrate which flows from the filter cake are inoculated with microorganisms from the filtering aid compost. The microorganisms which are transferred into the filter cake through the compost start a spontaneous biological decomposition process and begin decay. Since at this stage sufficient atmospheric oxygen is present, this decomposition process has aerobic character and unpleasant odors are not present. Accordingly, the applied compost essentially absorbs the gases which emerge from the sludges and avoids the production of unpleasant odors. This has been found particularly advantageous in the intermediate storage or during the transport of the drained sludge material. As a rule, the micoorganisms which, together with the compost, reach the filtrate, i.e., the pressings or the ballast water, are again fed to the biological clarification process. This has the effect of biological inoculation which advantageously influences the clarification process. Due to the filtration which is improved by the filtering aid, the portion of colloidal particles in the filtrate is also significantly reduced.

Moreover, such filtering aids can be obtained at the location of the sewage treatment plant from the incoming sludges. Accordingly, they no longer have to be purchased from third parties. The mixing arrangement, dosing pumps and agitating devices which are required in the case of the chemical filtering aids are also no longer required. Finally, the deodorization which takes place at the location of draining with the filtering aids of the present invention has an advantageous effect on the operating personnel.

The following describes filtering aids and their use in a filtration with precoating in accordance with the present invention on a traveling screen press.

Referring to the drawing, a layer of filtering aid 2 to 10 cm thick, consisting of compost, is loosely placed on the free portion A of the rotating screen belt 1 of a traveling screen press BP of conventional design by means of an oscillating chute 2 which extends over the width of the screen belt. The filtering aid is supplied from a container 3. The applied layer is subsequently impregnated with the suspension to be treated which, in this case, is domestic sewage sludge from container 5 in an amount corresponding to approximately 5 to 10 time the amount of compost which has been applied. The limit of the impregnation is determined by the fact that the liquid mixture which contains about 93 to 96 percent by weight water will not run off the screen belt. The impregnation is also carried out by means of a chute 4 which extends over the width of the screen belt and is fed from container 5. Containers 3 and 5 are attached to dosing devices 6 and 7, not shown in detail, in order to be able to determine the amounts of filtering aid and suspension which are being charged. When the suspension is applied, the filtering aid becomes soaked in a manner similar to a sponge.

As a result, the conveyed sludge particles are transported into the capillaries of the filtering aid and retained therein. Accordingly, the sludge dispersion no longer lies directly on the screen belt, as has been the case heretofore. The mixture applied in this manner is transported under the pressing belt 8 by means of screen belt 1 and is pressed between these two belts, the screen belt acting as a filter, the combination acting to effect a pressure filtration. The filtrate flows into a container 9, while the filter cake is conveyed into a container 10. Accordingly, the mechanical draining takes place in a conventional manner but the filtering effect of the screen belt is significantly increased by the filtering aid.

If necessary, due to the type of sludge to be drained, another layer of filtering aid of about 1 to 5 cm thickness may be placed onto the layer impregnated by the suspension in the above-described manner. The preferred filtering aid is compost having a moisture content as low as possible. The dosing arrangements can be conventional, e.g., metering screws.

EXAMPLE

Domestic sewage sludge, mixed with 10 to 15 percent of a natural carbon carrier is decayed within an enclosed aerating reactor, as described, for example, in U.S. Pat. No. 4,062,770. After being discharged from the container, it is subjected to a final decay of about 1 to 2 weeks at temperatures of about 30° to 40° C. The compost obtained in this manner which is biologically active, e.g., contains large amounts of microorganisms, actinomycetes, bacteria, small animals, etc., can be used directly as a filtering aid without long intermediate storage.

What is claimed is:

1. A method for draining waste sludge suspensions comprising applying a uniform, loosely placed layer of a filtering aid comprising a mixture of porous, particulate, largely decomposed but biologically active compost having a fibrous structure and a water content from about 30 to 50 percent by weight, and having been communicated into a uniform structure with an average particle size of no more than 10 cm, with the capability to absorb liquids and sludge particles and having particle sizes larger than the sludge particles, and having a thickness of about 2 to 10 cm, onto the screen belt of a traveling screen press, impregnating the layer by spraying it with the suspension to be drained, and then draining the layer under pressure.

2. The method of claim 1 wherein the filtering layer is sprayed in an amount of suspension from five to ten times that of the filtering layer.

3. The method of claim 1 wherein another uniform layer of the filtering aid having a thickness of about 1 to 5 cm is placed onto the layer impregnated with the suspension.

4. The method of claim 1 wherein the biologically active compost has the following characteristics:
water content: 37.4%
organic substance: 55.3%
pH value: 7.0,
strong fungoid, smells like compost, dark brown color, little fluorescence, bacteria:
actinomyces (grey)
actinomyces (white)

fungi: micromonospora species.

5. A method for draining waste sludge suspensions comprising applying a uniform, loosely placed layer of a filtering aid, the layer having a thickness of from 2 to 10 cm. onto a screen belt of a traveling screen press and impregnating the filtering aid layer by spraying it with the sludge suspension to be drained and thereafter draining the suspension under pressure, said filtering aid comprising a mixture of porous, particulate, largely decomposed but biologically active compost having a fibrous structure and a water content from about 30 to 50% by weight and having been comminuted into a uniform structure with an average particle size of no more than about 10 cm., with a capability to absorb liquids and sludge particles and having particle sizes larger than the sludge particles and having the following characteristics:

organic substance: 55.3%
pH value: 7.0,
strong fungoid, smells like compost dark brown color, little fluorescence, bacteria:
actinomyces (grey)
actinomyces (white)
fungi: micromonospora species.

6. The method of claim 5 wherein the filtering layer is sprayed in an amount of suspension from five to ten times that of the filtering layer.

7. The method of claim 5 wherein the filtering aid has a water content of about 40 percent by weight.

* * * * *